G. VON POST.
GUIDING DEVICE FOR RECIPROCATING MACHINE ELEMENTS.
APPLICATION FILED FEB. 18, 1916.
1,256,748. Patented Feb. 19, 1918.
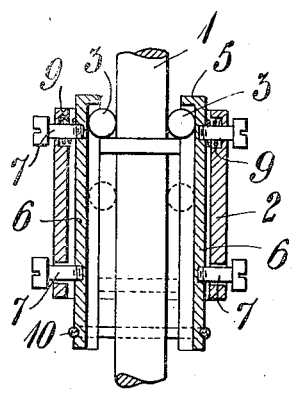
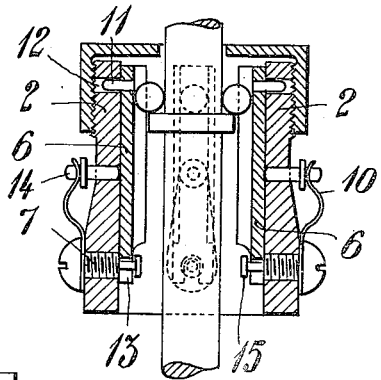
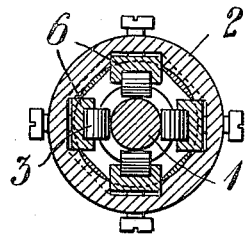
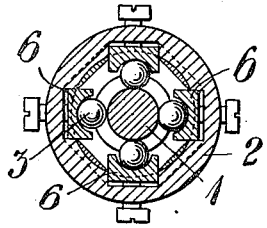
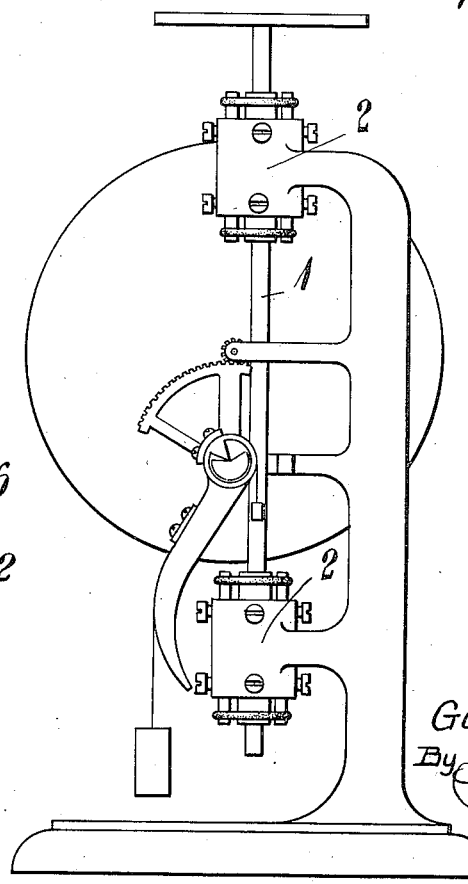
Inventor
Gustaf von Post
By
Attorney.

UNITED STATES PATENT OFFICE.

GUSTAF von POST, OF STOCKHOLM, SWEDEN.

GUIDING DEVICE FOR RECIPROCATING-MACHINE ELEMENTS.

1,256,748.   Specification of Letters Patent.   Patented Feb. 19, 1918.

Application filed February 18, 1916. Serial No. 79,032.

*To all whom it may concern:*

Be it known that I, GUSTAF VON POST, a subject of the King of Sweden, residing at 3 Blasicholmsgatan, Stockholm, Sweden, have invented new and useful Improvements in Guiding Devices for Reciprocating-Machine Elements, of which the following is a specification.

The present invention relates to such guiding means for reciprocating machine elements in which antifriction members in the form of balls or rollers are used. These balls or rollers reciprocate at the same time as the guided element but with another speed than the latter. Theoretically they should therefore occupy determined positions when the guided element changes its direction of movement. It is, however, likely to happen, that the balls or rollers by reason of their inertia do not change their direction of movement simultaneously with the reciprocating element but are somewhat displaced with relation thereto. A ball or roller may thus be displaced so as to strike the flange or end wall of the guiding device, which serves to limit the movement of the ball or roller in one direction, before the reciprocating element has completed its stroke in said direction. The ball or roller is consequently kept from rolling during the remainder of the stroke and thus causes a great friction against the reciprocating element, the movement of which thus is considerably impeded.

The inconvenience just referred to occurs in a still higher degree, if on account of a one-sided lateral pressure on the movable element the balls or rollers on one side of said element will be loose and free to roll in one direction or the other, whereby they may reach one end wall of the guiding device long before the reciprocating element has reached its corresponding end position.

For avoiding the aforesaid inconvenience, it has already been proposed to provide stops or abutments on the relatively movable elements, said stops and abutments having the balls or rollers movable between them and being so arranged relatively to each other, that the distance between said abutments in the end position of the reciprocating elements is equal or approximately equal to the diameter of the balls or rollers employed whereby said balls or rollers always will be caused to occupy predetermined positions when the reciprocating element changes its direction of movement. The displacement of the balls or rollers which thus may occur is only that which takes place while the reciprocating element moves from one end position to another.

In order to entirely prevent even this displacement, there is employed, according to the present invention, a device for continuously maintaining the balls or rollers in contact with both of the surfaces between which they are situated, so that a free rolling of the balls or rollers is prevented with a one-sided load.

In the accompanying drawing, Figure 1 shows a longitudinal section of a guiding device with abutments and means for preventing a free rolling of the anti-friction members. Fig. 2 shows a cross section of the device according to Fig. 1, in which the antifriction members consist of rollers. Fig. 3 shows a cross section of the same device in which the antifriction members consist of balls. Fig. 4 shows a longitudinal section of another form of guiding device. Fig. 5 shows the invention applied to a weighing apparatus.

In the mechanism shown in Figs. 1–3, the balls or rollers 3 are placed between the element 1 and guiding rails 6 which are arranged in slots in the casing 2. These rails are provided with longitudinal guiding grooves for the balls or rollers and are supported by bolts 7 traversing holes in the casing 2. The guiding rails are held against the balls or rollers either by means of springs 9 surrounding said bolts 7 or by means of spring bands or rings 10 surrounding all the rails. The heads of the bolts 7 serve to limit the movement of the rails toward the element 1 to the amount necessary for holding the balls in position. By this arrangement, the balls or rollers are always kept resting against the element 1 as well as against the guiding rails and can not perform unintentional movements along said element with a one-sided load thereon. With this device, a good guiding can be obtained with only one row of balls.

In the form shown in Fig. 4, the guiding rails 6 are arranged freely within the casing 2 but are guided with respect thereto by means of pins 11 engaging holes 12 in the casing, while screws 7 screwed into the latter engage open slots 13 at the lower ends of the rails. The balls 3 are held against the member 1 by the action of leaf springs 10 which bear against collars on pins 14 traversing the casing 2 and bearing, at their inner ends, against the middle portion of the rails 6. The screws 7, inside the rails 6, have shoulders 15 which limit the inward movement of the lower ends of said rails. Thus these lower ends to a certain extent act as pivoting points for the rails, although permitting a certain amount of rectilinear movement.

In the application of the invention to a weighing apparatus as illustrated in Fig. 5, the vertically reciprocatable rod 1, which serves to support the load, is guided by means of two guiding devices of the kind shown in any of the preceding figures. The invention is further applicable anywhere the object is to guide a reciprocating element.

If, in such case, it is desired to prevent any tendency of rotation of the guiding element, this can also be accomplished by providing guiding slots for the balls or rollers in the guided element.

Having now particularly described the nature of my invention and the manner of its operation, what I claim is:

1. A guiding device for reciprocating machine elements comprising, in combination with a stationary element and a reciprocating element, a guiding rail pivotally mounted between said elements, an anti-friction member interposed between the said rail and one of the said elements, and means for yieldably pressing the guiding rail against its anti-friction member.

2. A guiding device for reciprocating machine elements comprising, in combination with a stationary element and a reciprocating element, a guiding rail pivotally mounted between said elements, an anti-friction member interposed between the said rail and one of the said elements, means for yieldably pressing the guiding rail against its anti-friction member, and means for limiting the degree of pivotal movement of the said rail.

3. A guiding device for reciprocating machine elements comprising, in combination with a stationary element and a reciprocating element, a guiding rail pivotally mounted between said elements, an anti-friction member interposed between the said rail and one of the said elements, means for yieldably pressing the guiding rail against its anti-friction member, and adjustable means for limiting the degree of pivotal movement of the said rail.

4. A guiding device for reciprocating machine elements comprising, in combination with a stationary element and a reciprocating element, a guiding rail pivotally mounted between said elements, an anti-friction member interposed between the said rail and one of the said elements, means for yieldably pressing the guiding rail against its anti-friction member, and a limiting screw adjustably connecting the said rail with the other one of said elements.

5. A guiding device for reciprocating machine elements comprising, in combination with a stationary element and a reciprocating element, a guiding rail mounted between the said elements and having an open slot in one end, an adjustable screw threaded in one of the said elements and having limiting shoulders and a reduced portion between shoulders for engagement within the slot of the guiding rail, the element which carries the screw being provided with a hole adjacent to the opposite end of the guiding rail, a pin projecting from the said rail and fitting loosely in the hole in the last-mentioned element, and an anti-friction member interposed between the said rail and the other element.

6. A guiding device for reciprocating machine elements comprising, in combination with a stationary element and a reciprocating element, a guiding rail mounted between the said elements and having an open slot in one end, an adjusting screw threaded in one of the said elements and having limiting shoulders and a reduced portion between shoulders for engagement within the slot of the guiding rail, the element which carries the screw being provided with a hole adjacent to the opposite end of the guiding rail, a pin projecting from the said rail and fitting loosely in the hole in the last-mentioned element, an anti-friction member interposed between the said rail and the other element, and resilient means pressing the guiding rail against the anti-friction member.

In testimony whereof I have signed my name to this specification in the presence of two subscribing witnesses.

GUSTAF von POST.

Witnesses:
BIRGER NORDFELDT,
ADA SIMON.